United States

Carey

4,097,110
Jun. 27, 1978

[54] DEPOLARIZATION MEASUREMENT BY OPTICAL HETERODYNE

[75] Inventor: Charles Carey, Burlington, Mass.

[73] Assignee: Sanders Associates, Inc., Nashua, N.H.

[21] Appl. No.: 791,365

[22] Filed: Apr. 27, 1977

[51] Int. Cl.$^2$ ............................. G02F 1/11; G01J 4/04
[52] U.S. Cl. ..................................... 350/149; 356/114; 356/116
[58] Field of Search ................................ 356/114–118; 350/149, 161 W; 250/225, 199

[56] References Cited

U.S. PATENT DOCUMENTS

3,572,938   3/1971   Bradford ............................. 356/116

OTHER PUBLICATIONS

Andrade, O. "Optical Heterodyning Ellipsometry Measurements", Applied Optics 6–1976, pp. 1378–1379.

*Primary Examiner*—John K. Corbin
*Assistant Examiner*—Wm. H. Punter
*Attorney, Agent, or Firm*—Louis Etlinger; Robert K. Tendler

[57] ABSTRACT

A sensitive, noise-free ellipsometer measures depolarization of an incident beam by forming from the reference and signal components of the incident beam a signal component polarized in one direction, and a frequency shifted local oscillator component polarized in the same direction, with these latter components being optically heterodyned at a detector. In the formation of the local oscillator component, the reference component of the incident beam is shifted in frequency from that of the signal component of the incident beam and rotated 90° from its original orientation so that optical heterodyning can take place. This is accomplished by passing the incident beam through a shear-wave, traveling wave acoustic modulator which forms local oscillator and signal beams, each having rotated and frequency shifted components, and unrotated and unshifted components. Thereafter, all the light from the modulator is incident on a polarization analyzer which selects for heterodyning the unshifted, unrotated components of the signal beam and shifted, rotated components of the local oscillator beam. The shear wave action of the modulator operates to provide the rotation, while the traveling wave action of the modulator assures that the frequency shift is in only one direction.

13 Claims, 5 Drawing Figures

DEPOLARIZATION MEASUREMENT BY OPTICAL HETERODYNE

FIELD OF THE INVENTION

This invention relates to depolarization measurements and more particularly to a method and apparatus for measuring depolarization by utilization of optical heterodyning.

BACKGROUND OF THE INVENTION

In the past, depolarization of light beams has been measured typically by the use of cross polarizers which measure the extent to which one orthogonal component of a linearly polarized beam, usually the "signal" component, is extinguished relative to the other orthogonal component, which is usually referred to as the "reference" component. In essence, therefore, the term "depolarization" as used herein, refers to the extent to which a linear polarized beam has an orthogonal component.

Recently, more precise polarization measurements have been made with polarization modulators placed before or in front of an interaction zone as described by V. P. Chebotayev and B. I. Troshin, Applied Physics 11,303–305 (1976). Wollaston prisms and rotating linear polarizers have also been used as described by J. N. Bradford and J. W. Tucker in Applied Optics, March 1969, Vol. 8 #3.

It will be appreciated that a fully linearly polarized signal will have no orthogonal component. When linearly polarized energy is passed through a medium, such as a gas, a Faraday rotation type material, or an optical modulator, such as used in optical communications, the effect of the medium on the energy can result in an orthogonal signal component being generated. In Faraday effect material this is accomplished by the rotation of the original or reference component vector, or a portion thereof, such that a portion of the energy after the interaction has a polarization component orthogonal to the original reference component.

In certain atomic absorption systems, assuming the characterization of linearily polarized light as containing equal righthand circularly polarized (RHCP) and lefthand circularly polarized (LHCP) components, the passage of this energy through an absorbing medium can, in certain instances, result in more absorption of the RHCP component than the LHCP component, or vice versa. This differential absorption occurs when the frequency of the absorbing energy is somewhat offset from the frequency of the transition at which absorption takes place. Such a differential absorption can be characterized in terms of producing a signal component orthogonal to the original reference component. The magnitude of the signal component is thus proportional to the difference in absorption between the lefthand circularly polarized and righthand circularly polarized components. Such is the case, when linearly polarized light is utilized in measuring Zeeman shifts which are shifts of the spectral line of a given element due to the presence of a magnetic field. In such a case, the magnitude of the signal component is proportional to the strength of the magnetic field and the apparatus functions as a magnetometer.

Taking the case of the magnetometer, it is possible that the magnitude of this signal component will be six orders of magnitude down from that of the reference component. It is therefore with some difficulty that the signal component is resolved through the use of the aforementioned cross polarization technique. With the signal component magnitude some six orders of magnitude down from the reference component magnitude, it is often times impossible to detect the signal without sensitive detection techniques.

In order to detect these very small signal components, it is convenient to utilize so-called optical heterodyning. However, heterodyning usually requires an off frequency local oscillator to provide a reference beam with which the signal beam is combined or "heterodyned." The result of heterodyning is an intermediate frequency (IF) signal at a lower frequency, the amplitude of which is proportional to the original signal component. The problem with utilizing a separate light source as a local oscillator for optical heterodyning is the difficulty of generating a reference beam which is coherent with the signal beam. Without coherence, the information in the signal component is lost. On the other hand, in homodyning, which involves the mixing of two signals of like frequency, large self-beating signals are generated which destroys the information in the signal component.

It should be noted that because the signal component is orthogonal to the reference component, it is impossible to obtain any type of heterodyning effect at the detector regardless of coherence unless the incoming beam is somehow altered.

In the subject invention, a sensitive, noise-free ellipsometer measures the depolarization of an incident coherent light beam by forming from the incident beam a signal component polarized in one direction and a frequency shifted local oscillator component polarized in the same direction. The local oscillator component is formed by rotating the reference component in the incident beam by 90°. It is these two components which are then suitable for heterodyning at a detector. This is unlike the Chebotayev et al. device which is only capable of small rotations and which does not use heterodyning or a local oscillator beam.

In the formation of the local oscillator component, a portion of the original reference component is shifted in frequency from that of the signal component and rotated 90° from its original orientation so that optical heterodyning can take place. This is accomplished by passing the incident beam through a shear wave, traveling wave, acoustic modulator which forms a reference beam and a signal beam, each having two components. One of the components of each beam is rotated and frequency shifted by the modulator, while the other component of each beam passes through the modulator unrotated and unfrequency shifted. Thereafter, all the light from the modulator is incident on a polarization analyzer which selects for heretodyning the unshifted, unrotated components of the signal beam and the shifted, rotated components of the local oscillator beam. The shear wave action of the modulator operates to provide the aforementioned rotation while the traveling wave action of the modulator operates to shift the frequency of these components in only one direction. Thus, two functions are accomplished by one unit unlike the two devices of the Bradford et al. reference.

In summary, from the incident beam basically four components are formed: two signal beam components, one shifted and rotated and the other unshifted and unrotated; and two local oscillator beam components, one frequency shifted and rotated and the other unfrequency shifted and unrotated. Thereafter, a polarization analyzer selects the unshifted, unrotated signal component and the shifted, rotated local oscillator component for the heterodyne detection.

The output of the detector at which heterodyning takes place is coupled to a high pass filter and then to apparatus which normalizes the output signal from the high pass filter such that an output signal is formed whose amplitude is proportional to the intensity of the original signal component in the incident beam. The use of the high pass filter eliminates the $\frac{1}{2} E_S^2 + \frac{1}{2} E_R^2$ terms such that the output signal is a function of the cross terms $E_S \times E_R$ only. Thus, if $E_S \sim 10^{-6} E_R$, the output of the heterodyne system is $E_S \times E_R = 10^{-6} E_R^2$ while the output of a cross polarization detector is $E_S^2 = 10^{-12} E_R$. This results in a six order of magnitude improvement over what was heretofore possible with cross polarization detection techniques.

The normalizing signal is derived from those components which are reflected away by the polarization analyzer. It will be appreciated that while the polarization analyzer permits passage of the unshifted unrotated signal component and the shifted, rotated local oscillator component, it reflects away the unshifted, unrotated local oscillator component and the shifted, rotated signal component. As for the shifted, rotated signal component, this component is insignificant as compared to the reflected, unshifted unrotated local oscillator component, and can be disregarded. In order to derive the normalizing signal, a detector in effect detects the amplitude of the unshifted, unrotated local oscillator component reflected from the polarization analyzer and takes the square root of it. The resultant signal, $E_R$, is the field strength of the reference signal. Dividing the output of the high pass filter, $E_R \times E_S$, by this signal results in a signal, $E_S$, which is the field strength of the original signal component in the incident beam.

Alternatively, normalization can be accomplished without taking square roots by measuring the depolarization index, $m$, where $m = (E_S \times E_R)/E_R^2 = E_S/E_R$. It can be shown that modulation due to source and propagation effects cancels out of the ratio $m$.

The optical heterodyne apparatus described significantly improves the signal-to-noise ratio associated with most depolarization measuring techniques. Coherence for the heterodyned components is maintained in the subject invention by providing: (a) that the distance between the acoustic modulator and the heterodyne detector be short, (b) that the signal and local oscillator beams travel over the same path and (c) that a local oscillator is created for each frequency component in the signal. At typical optical frequencies in typical applications, the coherence length can be as low as 0.1 centimeters. Because of the short distance, the difference in path length between the signal component and the reference component are minimized, such that for all practical purposes the path length of the signal component from modulator to detector is exactly the same as that of the reference component. Because of the action of the acoustic modulator, there will be some divergence of the unshifted, unrotated signal component and the shifted, rotated reference component after modulation. By keeping the aforementioned path lengths short and/or proper design of modulator-analyzer-compensator the effect of the divergence can be neglected for all practical purposes.

What has been described therefore is a sensitive noise-free ellipsometer which utilizes optical heterodyning in which no separate local oscillator is utilized with the attendant problems of coherence; and in which homodyne techniques are avoided. The ellipsometer is not only useful in depolarization measurement, but may also be used as a sensitive demodulator for optical communication systems in which information is carried in terms of the depolarization of a light beam.

It is therefore an object of this invention to provide an improved ellipsometer;

It is another object of this invention to provide an ellipsometer which utilizes optical heterodyning to achieve increased performance characteristics;

It is yet another object to this invention to provide an optical heterodyne depolarization detection system in which a local oscillator beam is formed from rotation and frequency shifting of certain components of an incident beam such that optical heterodyning can be obtained between the depolarized signal and local oscillator derived from the unshifted, unrotated reference beam which dominates the incident beam;

It is yet another object of this invention to provide a means for normalizing out unwanted amplitude variations due to source variations and propagation path distortions;

It is yet another object of this invention to utilize a traveling/shear wave, acoustic modulator for modulating selected polarization components of an incident light beam to provide a local oscillator reference beam which has components which are shifted and rotated 90° so that optical heterodyning can take place;

It is yet another object to utilize a travelling/shear wave acoustic modulator to provide local oscillator beams for each frequency of a multi-frequency laser source;

It is a further object of this invention to provide the combination of a travelling wave, shear wave, acoustic modulator and a polarization analyzer and suitable compensators for providing an optical heterodyne detection system suitable for measuring depolarization of an incident light beam; and It is a still further object of this invention to provide an improved demodulator for optical communication systems.

These and other objects will be better understood in connection with the following description in view of the appended drawings in which:

DETAILED DESCRIPTION

Figure 1:
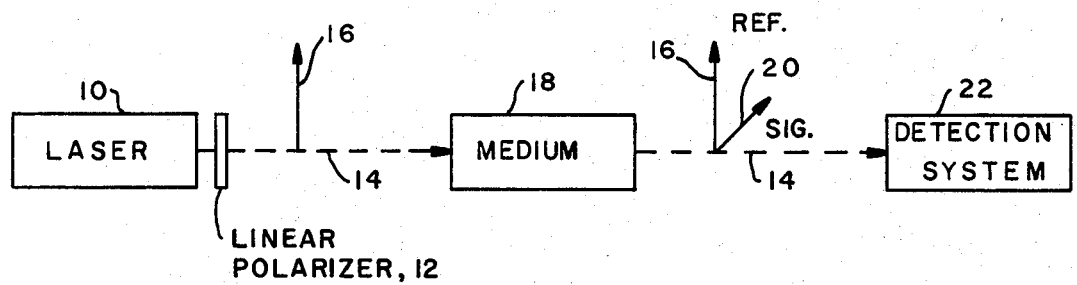
FIG. 1 is a block diagram illustrating the illumination of a medium with a linearly polarized, coherent light beam and the action of the medium on the light beam to produce a signal component, the magnitude of which is to be detected by a detection system.

As mentioned hereinbefore, it is often times desirable to detect the depolarization of an incident light beam in terms of orthogonal components of the beam, in which the relative magnitudes of the orthogonal components measure the amount of depolarization. Typical of such a system is one which involves a coherent light source such as a laser 10, the output of which is linearly polarized by a linear polarizer 12 such that its output beam 14 has a single component 16 as illustrated. This component is called the "reference" component of beam 14 and originally there is no orthogonal "signal" component. If beam 14 is incident on a medium 18 which may be a gas, a Faraday rotation type material, a modulator for an optical communications system, or any material or device which in effect rotates a portion of the reference component, then a "signal" component 20 will be generated. This component is orthogonal to the reference component and its magnitude is a measure of the depolarization of the incident beam.

While depolarization may be artificially induced by an optical modulator, such depolarization may be a result of scattering, differential absorption or naturally induced rotations in which a portion of the original reference component is rotated to a different position such that an orthogonal signal component exists. In order to detect the signal component, beam 14 is directed to a detection system 22, the purpose of which is to measure either the existance of or the magnitude of the signal component of the incident beam.

Figure 2:
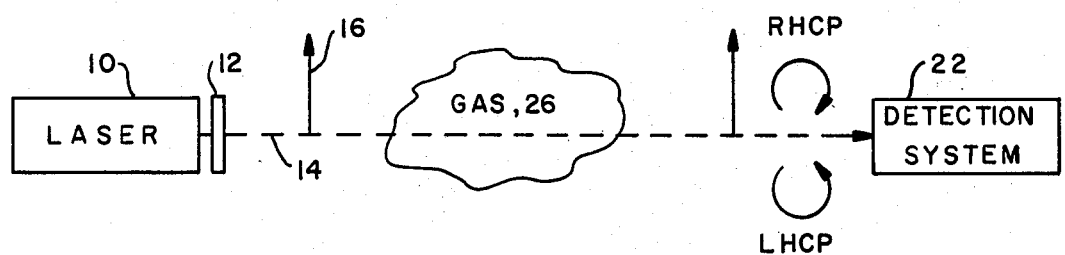
FIG. 2 is a block diagram illustrating a specialized case for the system of FIG. 1 in which a linearly polarized coherent light beam passes through a gas such that righthand circularly polarized and lefthand circularly polarized components are differentially absorbed, with the differential absorption resulting in a signal component orthogonal to the reference component.

This generalized description of a measurement system describes a great many situations and in general describes any measuring system in which the amount of depolarization of a linearly polarized light beam is sought. As described hereinbefore, for certain types of phenomenon the magnitude of the signal component may be 6 orders of magnitude down from that of the reference component after the incident beam has been acted on by the medium. Such is the case illustrated in FIG. 2. Here laser 10 produces a beam which passes through a gas 26, where the frequency of the laser $\nu_1$ is slightly offset from that of a predetermined transition of the atoms or molecules in the gas. The result is a differential absorption of righthand circularly polarized and lefthand circularly polarized components of the incident beam. It will be appreciated that any linearly polarized light beam may be characterized as having equal amounts of righthand circularly polarized and lefthand circularly polarized light. By tuning the laser as described, a differential absorption occurs in which the amount of righthand circularly polarized light absorbed will be quite different from the amount of lefthand circularly polarized light absorbed during the absorption interaction with the gas. This is equivalent to the generation of the aforementioned signal component, and it is this signal component which is measured by detection system 22. The signal component due to differential absorption may be typically 6 orders of magnitude down from the reference component and in some cases it is quite difficult to detect the signal component in the presence of such a large reference component.

Detection system 22, when utilizing the present optical heterodyning technique, can easily distinguish signal components which are six orders of magnitude down from reference components, and one such system will be described in connection with FIG. 4.

Figure 3:
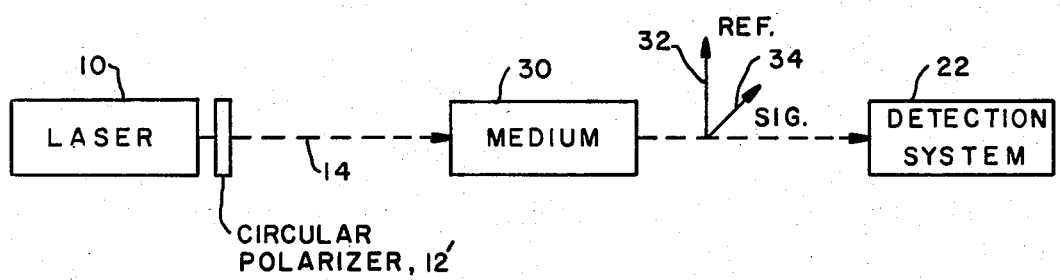
FIG. 3 is a block diagram of a system utilizing coherent circularly polarized light which after impinging on a medium is converted into orthogonally polarized light beam components which are subsequently detected by detection system.

Referring to FIG. 3, it is also possible to envision the situation in which the output from laser 10 is passed through a circular polarizer 12 such that beam 14 is circularly polarized when it impinges upon a medium 30. This medium takes the incoming circularly polarized beam and generates a reference and signal component. Here the reference component is given the reference character 32 and the signal component is given the reference character 34. After such interaction with medium 30, the resultant beam with its orthogonal components impinges on detection system 22 which measures the magnitude of the signal component. Medium 30 may be any type of material or device which takes circularly polarized light and in effect gives it some sort of linear polarization. Thus, the system of FIG. 3 is the exact opposite to that of FIG. 1. However, the operation of medium 30 is measured by detection system 22 in exactly the same way as the FIGS. 1 and 2 embodiments.

Figure 4:
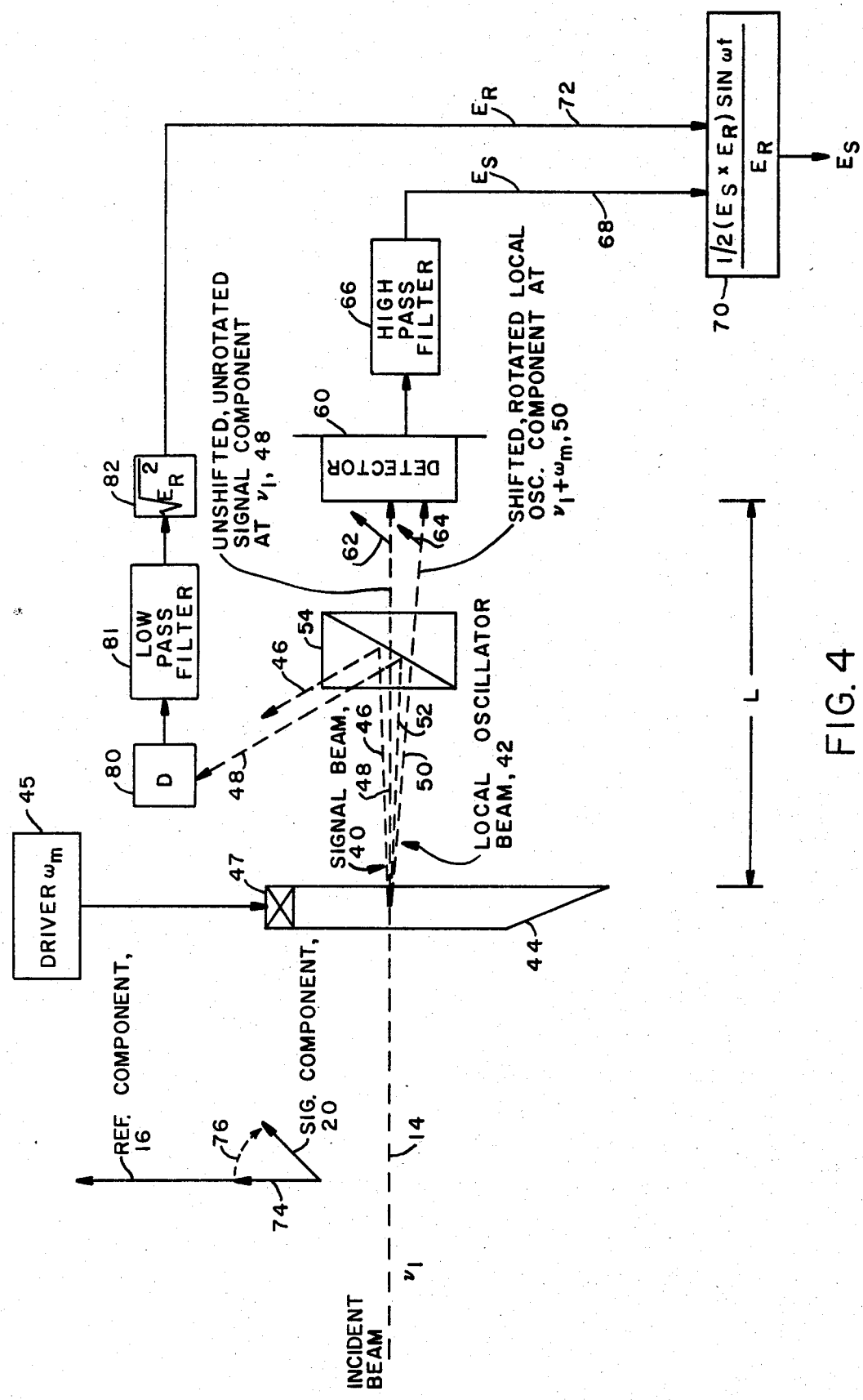
FIG. 4 is a schematic and block diagram of one embodiment of the detection systems of FIGS. 1, 2, and 3 in which the subject optical heterodyne detection technique is utilized.

In order to achieve sensitive depolarization detection, an optical heterodyne technique such as that illustrated in FIG. 4, takes the incident beam 14 and produces a signal beam 40 and a local oscillator beam 42. For purposes of this discussion we shall assume the incident beam is monochromatic and at a frequency $\nu_1$. Beams 40 and 42 are formed by passing the incident beam through a shear wave, traveling wave, acoustic modulator 44 driven by a driving unit 45 at a frequency $\omega_m$. In this embodiment the modulator includes a shear wave transducer 47 and an anisotopic medium 49, such as $LiNbO_3$, terminated at an angle which prevents standing waves. In this modulator the vertically propagating shear wave generates transverse acoustic waves which are colinear with the incident beam and interact with it to form beams 40 and 42 by Bragg diffraction. The frequency of the modulator in one embodiment is in the 10-20 MHz band. The shear wave, Bragg diffraction, action in the anisotropic medium causes certain components of the incident beam to be rotated 90° with respect to their original orientation, whereas, the traveling wave operation of the acoustic modulator causes these components to be frequency shifted by an amount $\omega_m$ in only one direction since there is no reflected acoustic energy and no standing waves in the modulator. The result is that after the incident beam passes through the modulator, signal beam 40 has two components, 46 and 48. Component 46 is a rotated 90° and frequency shifted component, and component 48 is the unrotated, unfrequency shifted component. Likewise, local oscillator beam 42 is comprised of two components, 50 and 52, with component 50 being frequency shifted and rotated by 90° and with component 52 being unshifted and unrotated.

All of these components, e.g. 46, 48, 50 and 52, are directed towards a conventional polarization analyzer 54 which selectively passes the unshifted, unrotated signal component at $\nu_1$, e.g. component 48, and the shifted, rotated local oscillator component at $\nu_1 + \omega_m$, e.g. component 50. One such analyzer is a variable from the Carl Lambrecht Co. as Model No. MGCADW-12. These two components are heterodyned at detector 60. It will be noted that the directions of polarization of components 48 and 50, as illustrated at 62 and 64, are the same. This is important because it is impossible to heterodyne orthogonally oriented linearly polarized signals or beams.

The output of detector 60 is applied to a high pass filter 66. The output of detector 60 in terms of field strength of the heterodyned components is given as follows:

$$\tfrac{1}{2} E_S^2 + \tfrac{1}{2} E_R^2 \quad (1)$$

$$\tfrac{1}{2} E_S \times E_R \sin \omega t \quad (2)$$

The purpose of the high pass filter is to filter out the $\tfrac{1}{2} E_S^2 + \tfrac{1}{2} E_R^2$ components. Therefore the output of the high pass filter is $\tfrac{1}{2} E_S \times E_R \sin \omega t$. The output signal from the high pass filter is applied over a line 68 to normalizing and processing circuit 70. The other input to the normalizing circuit is the quantity $E_R$ from line 72. The generation of the $E_R$ signal will be described hereinafter. The result of dividing the signal on line 68 by the signal on line 72 is $E_S$, the normalized signal component field strength. The alternative approach of measuring the depolarization index has been described hereinbefore.

What has occurred in this detection system is that a portion 74, typically 10 percent of the reference component, is rotated 90° as illustrated by the dotted arrow 76 such that 10 percent of the reference component is now in the same direction as the signal component. This is accomplished by the shear wave action of the acoustic modulator. Additionally, the acoustic modulator shifts the frequency of this rotated component by an amount $\omega_m$. Once having generated the shifted, rotated local oscillator component, it is passed through the polarization analyzer unaffected. A portion of the signal component in the incident beam passes through the acoustic modulator and the polarization analyzer unaffected, such that these two components are available for heterodyning. The other components of the incident beam are directed away from detector 60 and towards an additional detector 80. As far as the shifted, rotated signal component 46, the magnitude of this component is significantly less than the magnitude of the unshifted, unrotated local oscillator component 48. Thus, detector 80 is primarily responsive to the unshifted, unrotated local oscillator component and the amplitude of this signal from detector 80 reflects the magnitude of this component. The output of detector 80 is coupled to a conventional low pass filter 81 and then to a conventional unit 82 which takes the square root of the signal from the detector. The resultant output from unit 82 is the quantity $E_R$ which is used in the normalizing reference signal.

It will be appreciated that the shifted, rotated components diverge from the original optical axis of the system. Therefore, it is important to keep the distance between the acoustic modulator and detector 60 as short as possible unless a compensator is used. This distance is indicated by reference character L. In one operative embodiment distance L equals 2 cm. Distance L is not particularly critical as long as the divergence of the shifted, rotated components are small enough such that relative coherence between the components is maintained.

What has been provided is an exceptionally sensitive depolarization measurement system with a much increased signal-to-noise ratio over the crossed polarizer type systems. Its application extends to all cases in which depolarization is to be measured. The optical heterodyning takes place in the subject system because of the rotation of one of the orthogonal components to match the direction of polarization of the other of the components. Without this rotation, optical heterodyning cannot take place. The subject is utilized without a separate local oscillator and does not utilize any homodyning techniques.

Figure 5:
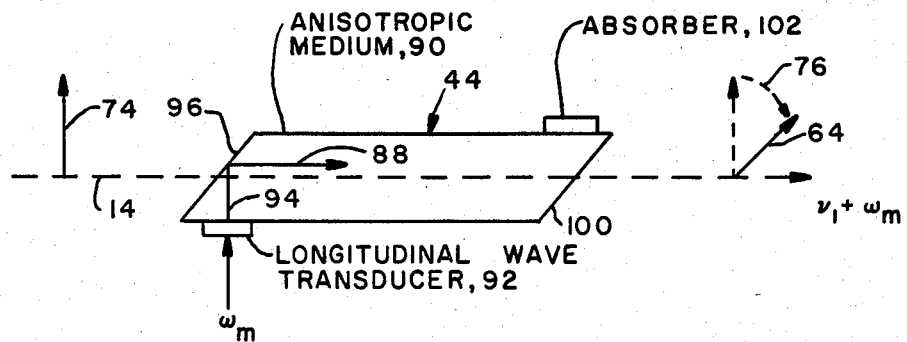
FIG. 5 is a schematic and block diagram of an acoustic modulator suitable for use in the subject invention.

Referring now to FIG. 5, acoustic modulator 44 of FIG. 4 may take on a different form. Rather than utilizing a shear wave transducer such as that shown at 47 in FIG. 4, an anisotropic medium 90 may be provided with a longitudinal wave transducer 92. The anisotropic medium may, in one embodiment be lithium niobate configured with a parallelogram cross section. The longitudinal wave transducer produces a longitudinal wave 94 which propagates vertically until it impinges upon slanted wall 96 of the anisotropic medium. At this point, a shear wave 98 is formed which travels colinearly with beam 14. When the shear wave impinges upon the opposing face 100 of the anisotropic medium it is reflected upwards towards an absorber 102 which absorbs the acoustic energy and therefore provides that the modulator is of a traveling wave variety. In one embodiment, absorber 102 may merely be a block of tungsten-loaded epoxy.

When the longitudinal wave transducer is driven at a frequency $\omega_m$, component 74, which is the same component as that illustrated in FIG. 4, is rotated as illustrated by arrow 76 by 90° so as to form the reference component 64. Thus, at least one linearly polarized component (the reference component) of the incident beam is rotated by 90° and has a frequency $\nu_1 + \omega_m$.

This modulator also permits the transmission of an unshifted and unrotated signal component at $\nu_1$. Likewise, an unshifted, unrotated local oscillator component and a shifted rotated signal component are also available at the output of the modulator. Thus, the modulator at FIG. 5 works identically to that of the modulator of FIG. 4. It will, however, be appreciated that longitudinal wave transducers in general are able to couple more acoustic energy into the medium than are presently available shear wave transducers, such as the one illustrated at 47 in FIG. 4. Thus, the modulator of FIG. 5 produces a shear wave colinear with the incident beam in which more energy is available for Bragg diffraction and rotation. The physics of the anisotropic medium is described in an article by S. E. Harris and W. R. Wallace entitled Acousto-Optic Tunable Filter published in the Journal of the Optical Society of America Volumn 59, number 1, page 744+, June 1969. This article describes the rotation and frequency shifting of the incident beam but does not describe the traveling wave aspect of the subject modulator. It will be noted that in this journal article the original work of R. W. Dixon is cited which appears in the I.E.E.E. Journal of Quantum Electronics, Volumn QE-3, number 2, February, 1967 and is entitled Acoustic Diffraction of Light in Anisotropic Media. The Dixon apparatus also appears to utilize the standing wave principle and likewise does not show the combination of a shear wave and traveling wave modulator.

While the subject invention has been described in terms of a modulator having an anisotropic medium, isotropic media are also utilizeable, since rotation is achieved at least as a second order effect. Note also that due to the short coherence length, if the subject modulator is used with a multi-frequency laser source, the modulator will produce local oscillator beams modulated about each frequency.

Although a specific embodiment to the invention has been described in considerable detail for illustrative purposes, many modifications will occur to those skilled in the art. It is therefore desired that the protection afforded by Letters Patent be limited only by the true scope of the appended claims.

What is claimed is:

1. Apparatus for measuring depolarization of a coherent incident beam of light comprising:
   a traveling wave/shear wave modulator interposed in the path of said beam for providing an unshifted, unrotated signal beam and a frequency shifted local oscillator beam rotated so that its direction of polarization matches that of said signal beam;
   means for selecting said unshifted unrotated signal beam and said shifted rotated local oscillator beam; and
   means for optically heterodyning the selected beams and producing an electrical signal representing the result of the heterodyning.

2. The apparatus of claim 1 wherein said selecting means includes means for selectively transmitting the selected beams.

3. The apparatus of claim 1 wherein said selecting means includes a polarization analyzer.

4. The apparatus of claim 1 and further including means for generating a normalizing signal from the output of said modulator.

5. The apparatus of claim 4 wherein said normalizing signal producing means includes a polarization analyzer.

6. The apparatus of claim 1 wherein said optical heterodyning means includes a photo detector.

7. The apparatus of claim 1 wherein said modulator includes an acoustic modulator medium, means for coupling acoustic energy at a predetermined frequency into said medium so as to produce shear waves at said frequency and means for preventing reflections of said shear wave energy within said medium so that the shear waves propagate as traveling waves without standing waves being produced.

8. The apparatus of claim 7 wherein said modulator includes a source of acoustic energy connected to said coupling means.

9. The apparatus of claim 7 wherein said reflection preventing means includes absorber means.

10. The apparatus of claim 7 wherein said reflection preventing means includes a surface of said modulator medium angled so as to prevent reflections of shear waves incident thereon back within said medium.

11. Apparatus for measuring depolarization of a coherent incident beam of light comprising:
    a traveling wave/shear wave modulator interposed in the path of said beam for providing an unshifted, unrotated signal beam and a frequency shifted polarization rotated local oscillator beam;
    means for selecting said unshifted unrotated signal beam and said shifted rotated local oscillator beam; and
    means for optically heterodyning the selected beams and producing an electrical signal representing the result of the heterodyning.

12. A method of measuring the depolarization of a coherent incident beam of light having a reference component, comprising:
    separating the incident beam into an unshifted unrotated signal beam and a frequency shifted local oscillator beam rotated so that its direction of polarization matches that of the signal beam after a signal component orthogonal to the reference component has been imparted to the incident beam;
    maintaining the coherence of the two separated beams over a predetermined short path; and
    optically heterodyning the separated beams after travel over the path.

13. Apparatus for measuring the depolarization of a coherent incident beam of light having a reference component, comprising:
    means for separating the incident beam into an unshifted unrotated signal beam and a frequency shifted local oscillator beam rotated so that its direction of polarization matches that of the signal beam after a signal component orthogonal to the reference component has been imparted to the incident beam; and
    means optically heterodyning the separated beams.

* * * * *